United States Patent
Chang

(10) Patent No.: US 11,928,075 B2
(45) Date of Patent: Mar. 12, 2024

(54) METHOD OF TRANSMITTING DATA AND COMMAND THROUGH RS232 SERIAL PORT

(71) Applicant: DELTA ELECTRONICS, INC., Taoyuan (TW)

(72) Inventor: Yung-Liang Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 113 days.

(21) Appl. No.: 17/846,894

(22) Filed: Jun. 22, 2022

(65) Prior Publication Data
US 2023/0289316 A1 Sep. 14, 2023

(30) Foreign Application Priority Data
Mar. 10, 2022 (CN) .......................... 202210233271.6

(51) Int. Cl.
*G06F 13/42* (2006.01)

(52) U.S. Cl.
CPC .. *G06F 13/4282* (2013.01); *G06F 2213/0002* (2013.01)

(58) Field of Classification Search
CPC ...................... G06F 13/4282; G06F 2213/0002
See application file for complete search history.

(56) References Cited

U.S. PATENT DOCUMENTS

| | | | | |
|---|---|---|---|---|
| 5,546,464 A * | 8/1996 | Raith | .................... | H04W 12/03 380/34 |
| 6,891,822 B1 * | 5/2005 | Gubbi | .................. | H04W 74/04 370/347 |
| 11,252,108 B2 * | 2/2022 | Kaushik | .............. | H04L 49/9057 |
| 2003/0154301 A1 * | 8/2003 | McEachern | ............ | H04L 45/16 709/237 |
| 2022/0103276 A1 * | 3/2022 | Dai | ........................ | H04J 3/0658 |
| 2023/0188983 A1 * | 6/2023 | Rigelsford | ............ | H04L 9/3242 713/168 |

* cited by examiner

*Primary Examiner* — Faisal M Zaman
(74) *Attorney, Agent, or Firm* — Chun-Ming Shih; HDLS IPR SERVICES

(57) ABSTRACT

A method of transmitting data and command through an RS232 serial port incorporated with a user-end device and a server-end device connected through the RS232 serial port is disclosed and includes following steps: accumulating a value of a first counter of the user-end device and a value of a second counter of the server-end device whenever a data is transmitted from the server-end device to the user-end device; controlling the server-end device to stop transmitting the data and to wait when both of the two values reach a triggering threshold; controlling the user-end device to transmit a control command to the server-end device through the RS232 serial port while the server-end device is waiting; and, resetting the first and the second counter and controlling the server-end device to restore to transmit the data to the user-end device after a waiting time is elapsed.

11 Claims, 6 Drawing Sheets

METHOD OF TRANSMITTING DATA AND COMMAND THROUGH RS232 SERIAL PORT

BACKGROUND OF THE DISCLOSURE

Technical Field

The present disclosure relates to a method of transmitting data and command, and specifically relates to a method of transmitting data and commands through an RS232 serial port.

Description of Related Art

In an industrial environment, a user-end device (such as an IPC) and a server-end device (such as a Servo) are usually connected through an RS232 serial port in order to transmit data and control commands between each other.

The standard transmission procedure of the RS232 serial port includes a hand-shaking procedure. In particular, after a sender transmits data to a receiver, the receiver has to respond to the sender with a confirmation signal to complete the entire transmission procedure of the data. However, the hand-shaking procedure transmitting back and forth may extremely waste the communication time; therefore, the total data amount being transmitted within a unit time may be reduced. In sum, the RS232 serial port is inadequate to be used to execute real-time data transmitting tasks.

Please refer to FIG. 1, which is a schematic diagram showing a transmission task through an RS232 serial port according to related art. In the embodiment of FIG. 1, a user-end device 1 and a server-end device 2 are connected with each other and execute a standard transmitting procedure with each other through the RS 232 serial port 3. If the user-end device 1 sends a control command 11 to the server-end device 2, the server-end device 2 must respond to the user-end device 1 with a confirmation packet 12 after the control command 11 is received. Similarly, if the server-end device 2 sends data 21 to the user-end device 1, the user-end device 1 must respond to the server-end device 2 with another confirmation packet 22 after the data 21 is received.

Generally, the server-end device 2 may be used to connect to industrial devices in the factory, so as to collect and record real-time data of the industrial devices. The server-end device 2 transmits the recorded data to the user-end device 1, so that a user of the user-end device 1 may monitor the industrial devices in real-time through the user-end device 1. In the aforementioned usage environment, the amount of the data 21 transmitted by the server-end device 2 may be massive (e.g., each data has a size of 1-64 KB). If the aforementioned standard transmitting procedure is applied, the massive amount of data 21 may not be transmitted completely during a limited time period (i.e., during a unit time). As a result, the requirement of real-time monitoring may not be achieved.

In sum, it is necessary for the developers in the technical field to study and modify the current transmitting procedure of the RS232 serial port to increase its data throughput.

SUMMARY OF THE DISCLOSURE

The present disclosure is directed to a method of transmitting data and commands through an RS232 serial port, which may enable the user-end devices using the RS232 serial port to receive a maximum amount of data in a shortest time period.

In one of the exemplary embodiments, the method is incorporated with a user-end device and a server-end device connected through an RS232 serial port and includes the following steps:

a) controlling a first counter of the user-end device and a second counter of the server-end device to accumulate synchronously when the server-end device transmits data to the user-end device;

b) re-executing the step a) repeatedly until counts of the first counter and the second counter reach a triggering threshold;

c) stopping transmitting the data to the user-end device for a waiting time period and temporarily storing the data to be sent during the waiting time period by the server-end device when the counts of the first counter and the second counter reach the triggering threshold;

d) sending a control command to the server-end device in the waiting time period by the user-end device; and e) clearing the first counter and the second counter after the waiting time period has elapsed, and then restoring to transmit the data to the user-end device by the server-end device.

In one of the exemplary embodiments, the method is incorporated with a server-end device and a user-end device connected through an RS232 serial port and includes the following steps:

a) controlling a first counter to accumulate when receiving data transmitted from the server-end device, wherein the first counter is synchronized with a second counter in the server-end device;

b) storing a control command to a command queue when the control command is going to be sent to the server-end device;

c) re-executing the step a) and the step b) before the count of the first counter reaches a triggering threshold;

d) transmitting the control command stored in the command queue to the server-end device when the count of the first counter reaches the triggering threshold; and e) after the step d), clearing the first counter and re-executing the step a) through the step d).

In one of the exemplary embodiments, the method is incorporated with a user-end device and a server-end device connected through an RS232 serial port and includes the following steps:

a) controlling a second counter to accumulate when transmitting data to the user-end device, wherein the second counter is synchronized with a first counter in the user-end device;

b) re-executing the step a) until the count of the second counter reaches a triggering threshold;

c) stopping transmitting the data to the user-end device for a waiting time period and temporarily storing the data to be transmitted during the waiting time period when the count of the second counter reaches the triggering threshold; and d) clearing the second counter and restoring to transmit the data to the user-end device after the waiting time period has elapsed.

In comparison with related art, the present disclosure assists the user-end device to use the RS232 serial port without executing a data hand-shaking procedure, so that the user-end device may receive a maximum amount of data in a shortest time period. In addition, when the user-end device transmits a control command to the server-end device, the control command being sent will not collide with the data transmitted from the server-end device.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure discloses a method of transmitting data and commands (referred to as the transmitting method hereinafter), and the transmitting method is incorporated with two or more than two electronic devices that transmit data and control commands with each other through an RS232 serial port.

Figure 1:
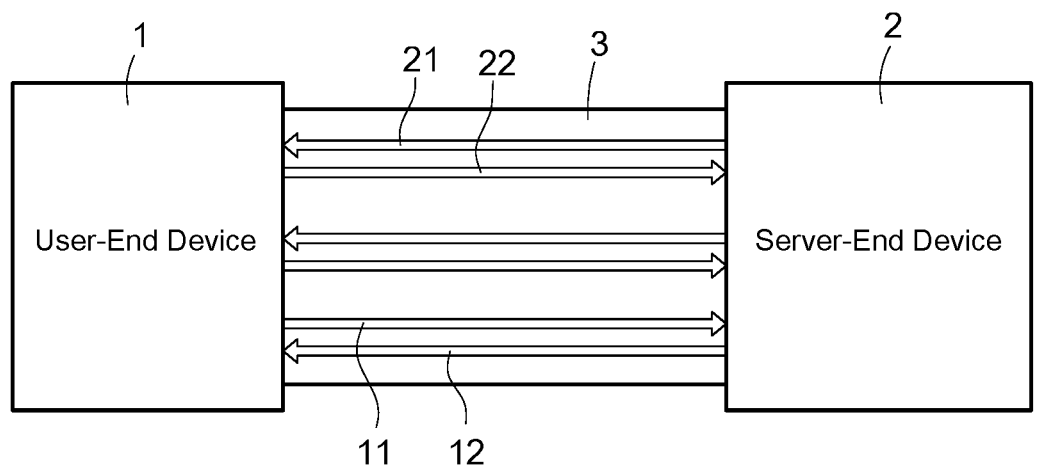
FIG. 1 is a schematic diagram showing a transmission task through an RS232 serial port according to related art.
Figure 2:
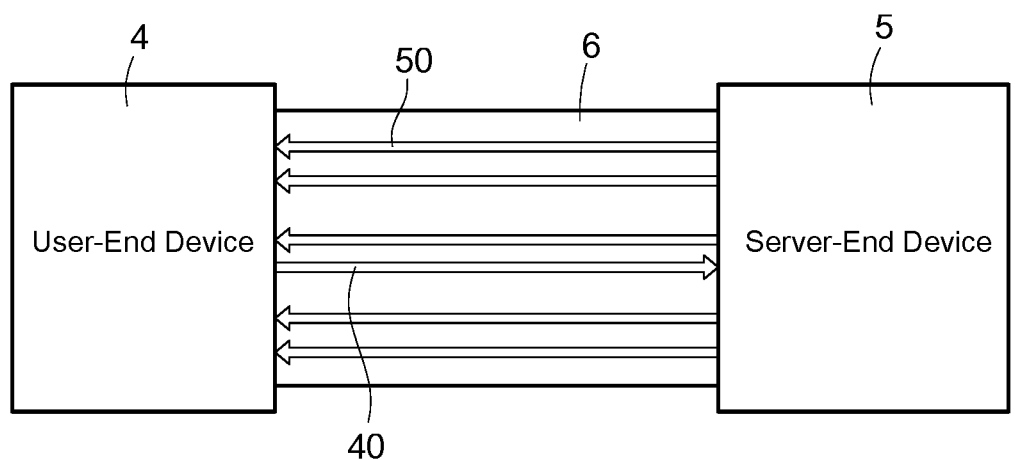
FIG. 2 is a schematic diagram showing a transmission task through an RS232 serial port of a first embodiment according to the present disclosure.

Please refer to FIG. 2, which is a schematic diagram showing a transmission task through an RS232 serial port of a first embodiment according to the present disclosure. As disclosed in FIG. 2, the transmitting method in the present disclosure is incorporated with a user-end device 4 and a server-end device 5 that are connected with each other through an RS232 serial port 6. By applying the transmitting method of the present disclosure, the user-end device 4 and the server-end device 5 may transmit data and control commands without executing a hand-shaking procedure, so that a maximum amount of data transmitted per unit time may be achieved.

In particular, the user-end device 4 may be, for example but not limited to, devices such as a personal computer (PC), an industrial PC (IPC), or a cloud server that are supportable to the RS232 serial port 6. When the user-end device 4 executes a specific application program or software, the user-end device 4 may communicate with the server-end device 5 through the RS232 serial port 6 and receive data 50 transmitted from the server-end device 5 through the RS232 serial port 6 in real-time.

The server-end device 5 may be, for example but not limited to, a server or a servo (especially an AC servo). The server-end device 5 may connect different types of industrial devices (not shown) used in the current environment; therefore, the server-end device 5 may transmit the data 50 of the industrial devices to the user-end device 4 through the RS232 serial port 6 in real-time based on the requirement of the user-end device 4 (especially the requirement from the application program or software run on the user-end device 4). Therefore, the main purpose of monitoring the industrial devices in real-time by using the user-end device 4 may be achieved.

In the embodiment of FIG. 2, the user-end device 4 (especially the application program or the software) may be modified, so that the modified user-end device 4 may not respond to the server-end device 5 with a corresponding confirmation packet after the data 50 sent from the server-end device 5 is received. On the contrary, the server-end device 5 is modified accordingly, so that the server-end device 5 may proceed to send the next data 50 to the user-end device 4 even if no confirmation packet is received. Therefore, the complete transmitting time of one data 50 may be effectively reduced, and the total transmitting amount of data 50 per unit time may be increased, so that the user may be satisfied with real-time monitoring through the RS232 serial port 6.

Because no confirmation packet is required, the server-end device 5 may continuously transmit the data 50 to the user-end device 4, so that the user-end device 4 is incapable of predicting when the server-end device 5 may stop transmitting the data 50 (i.e., when the RS232 serial port 6 may be idle). When the user-end device 4 wants to send a control command 40 to the server-end device 5 to control the server-end device 5, it should directly send the control command 40 to the server-end device 5 through the RS232 serial port 6 without performing any determination procedure in advance. In such a scenario, the control command 40 transmitted by the user-end device 4 may collide with the data 50 transmitted by the server-end device the server-end device 5 may not correctly receive the control command 40.

After the user-end device 4 receives the next data 50 transmitted by the server-end device and finds out through the content of the received data 50 that the status of the server-end device 5 does not change in accordance with the content of the control command 40 being sent before, the user-end device 4 may determine that the server-end device 5 did not receive the control command 40 correctly. In that case, the user-end device 4 needs to again transmit the same control command 40 to the server-end device 5.

For example, the user-end device 4 may send a control command 40 to the server-end device 5 to control the server-end device 5 stop computing. If the user-end device 4 continuously receives the computed data 50 from the server-end device 5 after the control command 40 has been transmitted, the user-end device 4 may determine that the server-end device 5 did not correctly receive the control command 40.

In order to resolve the above problem, the present disclosure provides another embodiment based on the embodiment as shown in FIG. 2.

Figure 3:
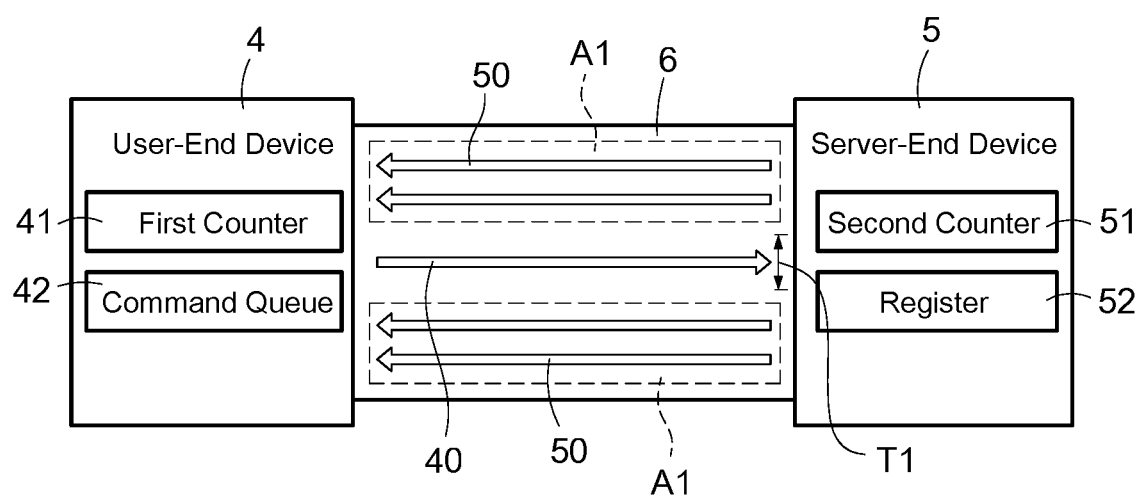
FIG. 3 is a schematic diagram showing a transmission task through an RS232 serial port of a second embodiment according to the present disclosure.

Please refer to FIG. 3, which is a schematic diagram showing a transmission task through an RS232 serial port of a second embodiment according to the present disclosure. The difference between the embodiment of FIG. 3 and the embodiment of FIG. 2 is that the user-end device 4 in FIG. 3 includes a first counter 41 and the server-end device 5 in FIG. 3 includes a second counter 51, wherein the first counter 41 and the second counter 51 are synchronized.

In particular, before transmitting the data 50 and the control command 40, the user-end device 4 and the server-end device 5 may respectively set the first counter 41 and the second counter 51 to be 0 (such as to execute a reset procedure), so that the first counter 41 and the second counter 51 may be synchronized. In addition, the user-end device 4 and the server-end device 5 may start transmitting the data 50 through the RS232 serial port 6 after the first counter 41 and the second counter 51 are synchronized.

In the present disclosure, when the server-end device 5 transmits the data 50 to the user-end device 4, the first counter 41 and the second counter 51 accumulate synchronously. When the counts of the first counter 41 and the second counter 51 meet a preset condition (e.g., the quantity of the data 50 being transmitted reaches a triggering threshold A1), the server-end device 5 may temporarily stop transmitting the data 50 to the user-end device 4.

In the transmitting method of the present disclosure, the server-end device 5 may temporarily stop transmitting the data 50 when the count of the second counter 51 meets the preset condition, wherein the server-end device 5 may continue the stop for a length of a waiting time period T1. In the meantime, the user-end device 4 knows that the server-end device 5 has entered the waiting time period T1 because the count of the first counter 41 meets the preset condition as well; therefore, the user-end device 4 transmitting the control command 40 that the user-end device 4 wants to send to the server-end device 5 during the waiting time period T1.

After the waiting time period T1 has elapsed, the user-end device 4 clears the first counter 41 and the server-end device 5 clears the second counter 51. In addition, the user-end device 4 stops transmitting the control command 40, and the server-end device 5 restores to transmit the data 50 to the user-end device 4. When the server-end device 5 restores to transmit the data 50, both the first counter 41 and the second counter 51 restart to accumulate along with the transmitting of the data 50.

The transmitting method of the present disclosure may ensure that the user-end device 4 only transmits the control command 40 to the server-end device 5 while the server-end device stops transmitting the data 50. As a result, the control command 40 transmitted by the user-end device 4 and the data 50 transmitted by from the server-end device 5 may be prevented from colliding with each other and cause the server-end device 5 to fail receiving the control command 40 correctly. Besides, the server-end device 5 only stops transmitting the data 50 during the waiting time period T1, but the server-end device 5 does not have to execute the standard hand-shaking procedure with the user-end device 4. Therefore, the user-end device 4 and the server-end device 5 may still provide a maximum transmitting amount of data in a unit time to satisfy the user requirement in real-time monitoring.

Figure 4:
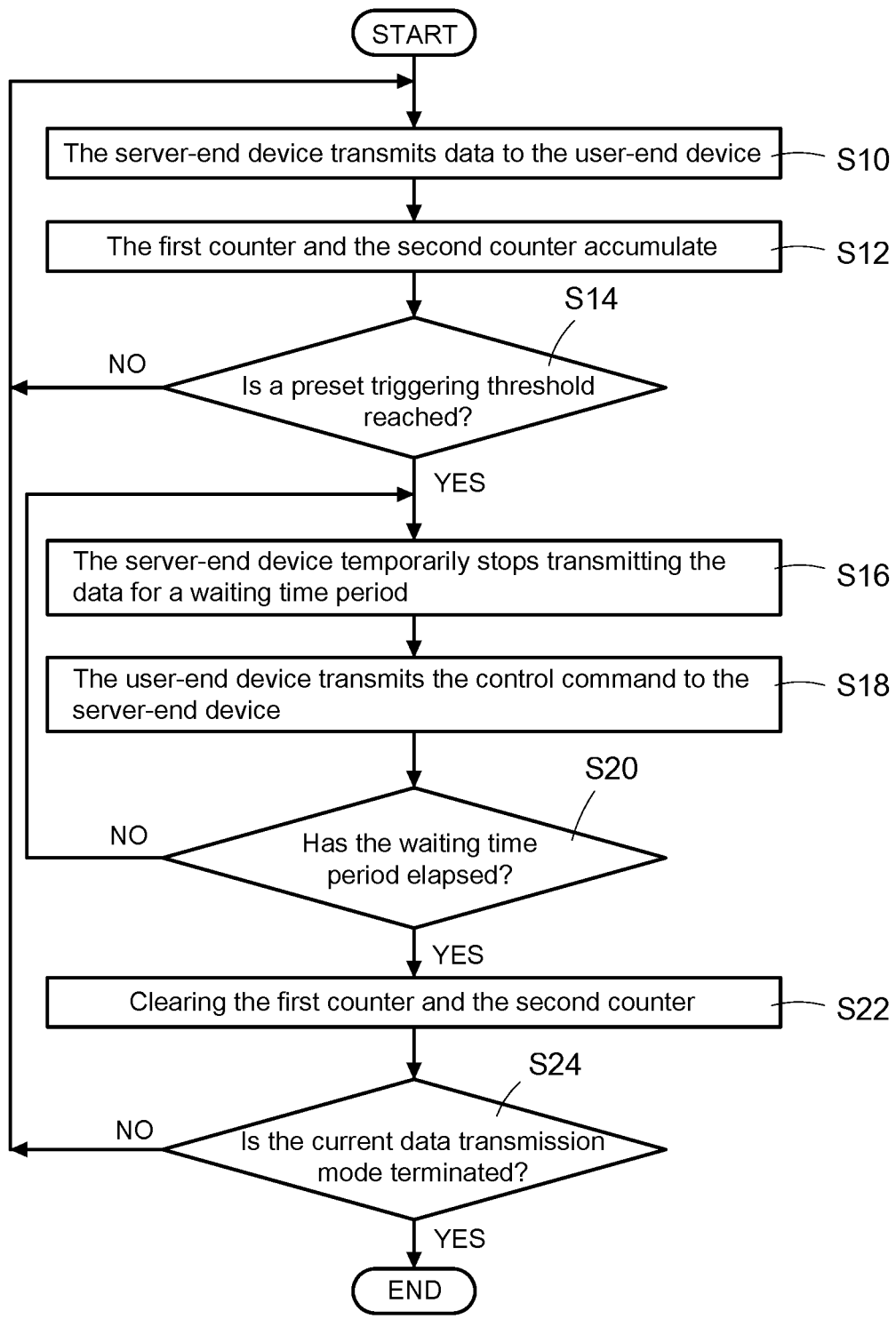
FIG. 4 is a transmission flowchart of a first embodiment according to the present disclosure.

Please refer to FIG. 3 and FIG. 4 at the same time, wherein FIG. 4 is a transmission flowchart of a first embodiment according to the present disclosure.

Each step shown in FIG. 4 may be applied to the transmission structure as shown in FIG. 3. In the present disclosure, the user-end device 4 and the server-end device 5 may connect with each other through the RS232 serial port 6 to execute each step shown in FIG. 4, so as to implement the purpose of real-time data transmitting.

As shown in FIG. 4, after the user-end device 4 starts to require data from the server-end device 5 (e.g., after the user-end device 4 runs a monitoring software or an application program), the server-end device 5 starts transmitting the data 50 to the user-end device 4 based on the requirement of the user-end device 4 (step S10). Also, the first counter 41 of the user-end device 4 and the second counter 51 of the server-end device 5 accumulate synchronously (step S12).

In one embodiment, the server-end device 5 controls the second counter 51 to accumulate (such as plus one) when transmitting one data 50 to the user-end device 4. Meanwhile, the user-end device 4 controls the first counter 41 to accumulate (such as plus one) when receiving the data 50 transmitted from the server-end device 5. In particular, the accumulated counts of the first counter 41 and the second counter 51 are the same, but the time point for the accumulation made by the first counter 41 and the second counter 51 may be different.

Next, the user-end device 4, the server-end device 5, or other electronic device (not shown) that is connected with the user-end device 4 or the server-end device 5 determines whether the counts of the first counter 41 and the second counter 51 reach a preset triggering threshold A1 (step S14).

In one embodiment, the server-end device 5 controls the second counter 51 to plus one when transmitting one data 50 to the user-end device 4. Similarly, the user-end device 4 controls the first counter 41 to plus one when receiving the data 50 transmitted from the server-end device 5. In the embodiment, the triggering threshold A1 may be set to a data amount that may be finished transmitting by the server-end device 5 within a designated time period. In the embodiment, the data amount may be five to ten for an instance, but not limited thereto.

In another embodiment, the second counter 51 may start time calculation after the server-end device 5 starts transmitting the data 50, and the first counter 41 may start time calculation after the user-end device 4 starts receiving the data 50. Step S14 discussed above includes determining whether the calculated time reaches a preset triggering threshold A1. In this embodiment, the triggering threshold A1 may be set to a time length that is enough for the server-end device 5 to transmit a satisfactory amount of data, such as 3000 ms, but not limited thereto.

For the sake of understanding, the description below is exemplified as controlling the first counter 41 and the second counter 51 to respectively plus one whenever the server-end device transmits one data 50 and the user-end device 4 receives the data 50, but not limited thereto. If it is determined in step S14 that the counts of the first counter 41 and the second counter 51 have not reached the triggering threshold A1, it returns to step S10, so that the server-end device 5 keeps transmitting the data 50 to the user-end device 4 and the first counter 41 and the second counter 51 keep accumulating. It should be mentioned that during step S10 and step S12, the user-end device 4 is forbidden to transmit any control command 40 to the server-end device 5 through the RS232 serial port 6.

In particular, as shown in FIG. 3, the user-end device 4 may include a command queue 42. Before the counts of the first counter 41 and the second counter 51 reach the triggering threshold A1, the server-end device 5 keeps transmitting the data 50 to the user-end device 4, and the user-end device 4 may store the control command(s) 40 that the user-end device 4 wants or needs to transmit to the server-end device 5 into the command queue 42.

If it is determined in step S14 that the counts of the first counter 41 and the second counter 51 reach the triggering threshold A1, the server-end device 5 may temporarily stop transmitting the data 50 to the user-end device 4 for a waiting time period T1 (step S16).

In the present disclosure, the counts of the first counter 41 and the second counter 51 are synchronized. When the server-end device 5 temporarily stops transmitting the data 50 due to the count of the second counter 51, the user-end device 4 may know that the server-end device will not transmit the data 50 temporarily due to the count of the first counter 41.

In the present disclosure, the server-end device 5 stores the data 50 that would be transmitted during the waiting time period T1 (such as storing the data 50 to the register 52 as shown in FIG. 3). Meanwhile, the user-end device 4 transmits the control command 40 to the server-end device 5 through the RS232 serial port 6 (step S18). In one embodiment, the user-end device 4 in step S18 is transmitting the one or more control commands 40 previously stored in the command queue 42 to the server-end device 5.

More specifically, the server-end device 5 temporarily stores the data 50 that would be transmitted to the user-end device 4 during the waiting time period T1, and the user-end device 4 transmits the control command(s) 40 to the server-end device 5 during the waiting time period T1. Through setting up the waiting time period T1, the control command 40 transmitted by the user-end device 4 and the data 50 transmitted by the server-end device 5 through the RS232 serial port 6 may not collide with each other, so that the server-end device 5 may be ensured in correctly receiving the control command 40.

Next, the user-end device 4, the server-end device 5, or other electronic device determines whether the waiting time period T1 has elapsed (step S20). Before the waiting time period T1 has elapsed, the user-end device 4 and the server-end device 5 re-execute step S16 and step S18, so that the server-end device 5 keeps storing the data 50 temporarily and the user-end device 4 keeps transmitting the control command 40.

In general, the size of the control command 40 is extremely smaller than the size of the data 50. The size of one data 50 may be 1-64 KB for example, and the size of one control command 40 may be 3050 byte for example. In the present disclosure, the length of the waiting time period T1 only needs to be long enough for the user-end device 4 to finish transmitting a complete control command 40. In one embodiment, the waiting time period T1 may be 100 ms, but not limited.

If the waiting time period T1 is determined in step S20 to have elapsed, the user-end device 4 and the server-end device 5 respectively clear the first counter 41 and the second counter 51 (step S22). Also, the user-end device 4, the server-end device 5, or other electronic device determines whether the current data transmission mode is terminated after the waiting time period T1 has elapsed (step S24), wherein the current data transmission mode may be, for example but not limited to, a transmission mode without the hand-shaking procedure. If the current data transmission mode is not yet terminated, it returns to step S10 so that the server-end device 5 restores to transmit the data 50 to the user-end device 4 through the RS232 serial port 6 and the first counter 41 and the second counter 51 restart to accumulate.

In a first embodiment, the user-end device 4 and the server-end device 5 respectively calculate the waiting time period T1 and respectively clear the first counter 41 and the second counter 51 after the waiting time period T1 has elapsed. In a second embodiment, the user-end device 4 clears the first counter 41 after the control command 40 has been finished transmitting and the server-end device 5 clears the second counter 51 after receiving the control command transmitted from the user-end device 4.

As mentioned above, the server-end device 5 may temporarily store the data 50 to be sent during the waiting time period T1. As a result, the amount of the data 50 first transmitted by the server-end device 5 after the waiting time period T1 has elapsed will be greater than the amount of the data 50 transmitted by the server-end device 5 at any other time point. In a third embodiment, the server-end device 5 may determine that the communication between itself and the user-end device 4 is normal upon receiving the control command 40 transmitted by the user-end device 4 during the waiting time period T1, so that the server-end device 5 may clear the second counter 51. On the contrary, the user-end device 4 may determine that the communication between itself and the server-end device 5 is normal after receiving the data 50 with an obviously greater data amount upon the waiting time period T1 has elapsed, so that the user-end device 4 may clear the first counter 41.

However, the above descriptions are only a few embodiments of the present disclosure, but not limited thereto.

As described above, if the waiting time period T1 has elapsed and the current data transmission mode has not been terminated, the server-end device 5 restores to transmit the data 50 to the user-end device 4. Because the data 50 that would be transmitted to the user-end device 4 during the waiting time period T1 is temporarily stored in the register 52, the server-end device 5 may first transmit the data 50 stored in the register 52 to the user-end device 4 after the waiting time period T1 has elapsed, and the first counter 41 and the second counter 52 may start accumulating synchronously. After the data 50 stored in the register 52 are transmitted completely, the server-end device 5 proceeds to transmit real-time data 50 to the user-end device 4 and makes the first counter 41 and the second counter 51 to accumulate synchronously.

Figure 5:
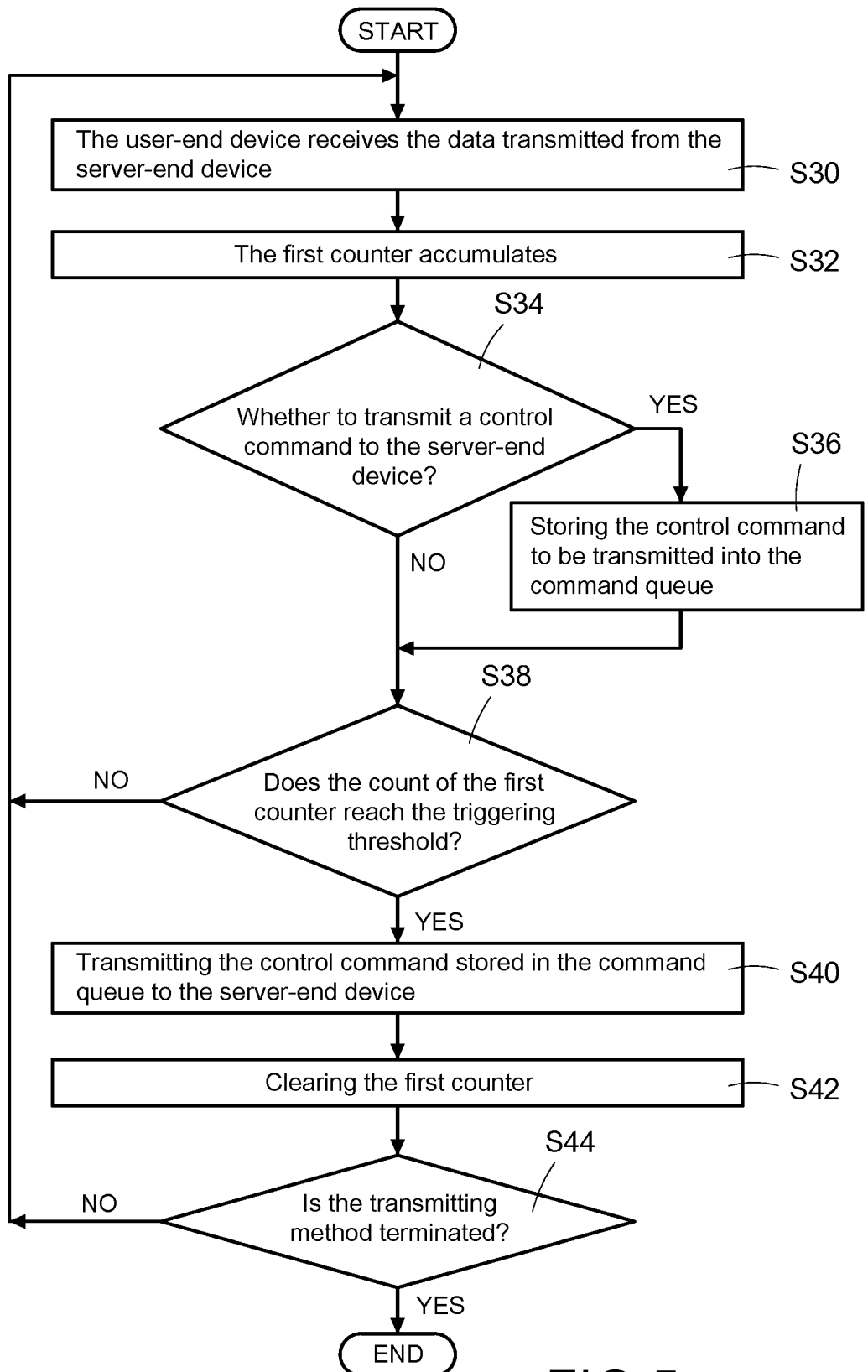
FIG. 5 is a transmission flowchart of a second embodiment according to the present disclosure.

Please refer to FIG. 3 through FIG. 5, wherein FIG. 5 is a transmission flowchart of a second embodiment according to the present disclosure. Each step shown in FIG. 5 may be applied to the transmission structure as shown in FIG. 3. FIG. 5 is used to interpret the flowchart as shown in FIG. 4 under a perspective of the user-end device 4.

As shown in FIG. 5, after the connection with the server-end device 5 is established through the RS232 serial port 6, the user-end device 4 may continuously receive the data 50 transmitted from the server-end device 5 through the RS232 serial port (step S30). In addition, the user-end device 4 controls the first counter 41 in the user-end device 4 to accumulate (step S32) whenever the data 50 is received. In particular, the count of the first counter 41 is synchronized with the count of the second counter 51 in the server-end device 5.

In one embodiment, the user-end device 4 controls the first counter 41 to plus one whenever one data 50 is received, but not limited.

Before the count of the first counter 41 reaches a preset triggering threshold (such as the triggering threshold A1 as shown in FIG. 3), the user-end device 4 keeps determining whether to transmit a control command 40 to the server-end device 5 (step S34). If a control command needs to be transmitted to the server-end device 5, the user-end device 4 first stores the one or more control commands 40 to be transmitted into the command queue 42 of the user-end device 4 according to a transmitting order (step S36). In other words, the user-end device 4 does not transmit any control command 40 to the server-end device 5 before the count of the first counter 41 reaches the triggering threshold A1.

As mentioned above, during the connection with the server-end device 5, the user-end device 4 continuously determines whether the count of the first counter 41 reaches the triggering threshold A1 (step S38). Next, the user-end device 4 re-executes step S30 through step S36 before the count of the first counter 41 reaches the triggering threshold A1, so that the user-end device 4 may continuously receive the data 50 transmitted from the server-end device 5, control the first counter 41 to accumulate, and temporarily store the control command 40 to be transmitted.

After the count of the first counter 41 reaches the triggering threshold A1, the user-end device 4 may directly identify that the server-end device 5 will temporarily stop transmitting the data 50 and the RS232 serial port 6 will temporarily be idle. Therefore, the user-end device 4 transmits, through the RS232 serial port 6, the one or more control commands 40 stored in the command queue 42 to the server-end device 5 in accordance with the transmitting order (step S40). After step S40, the user-end device 4 may clear the first counter 41 (step S42).

In a first embodiment, the user-end device 4 clears the first counter 41 after all the control commands 40 stored in the command queue 42 are transmitted completely. In a second embodiment, the user-end device 4 clears the first counter 41 after the aforementioned waiting time period T1 has elapsed. In a third embodiment, the user-end device 4 directly clears the first counter 41 right after the count of the first counter 41 reaches the triggering threshold A1. In a fourth embodiment, the user-end device 4 clears the first counter 41 when starting to receive the data 50 transmitted from the server-end device 5 and the data amount of the received data 50 is determined to be greater than the data amount of the data 50 received at other time points.

However, the above descriptions are a few embodiments of the present disclosure, but not limited thereto.

After step S42, the user-end device 4 determines whether the transmitting method of the present disclosure is terminated (step S44), and the user-end device 4 re-executes the above step S30 to step S42 until the transmitting method is terminated.

In one embodiment, the user-end device 4 activates the transmitting method of the present disclosure after accepting an external control (e.g., being triggered by the user) to enter a specific mode (such as an oscilloscope mode), and the user-end device 4 terminates the transmitting method after leaving the specific mode (detailed described in the following). In the embodiment, the user-end device 4 only operates in accordance with steps shown in FIG. 5 (i.e., step S30 to step S44) after the user-end device 4 enters the specific mode.

Figure 6:
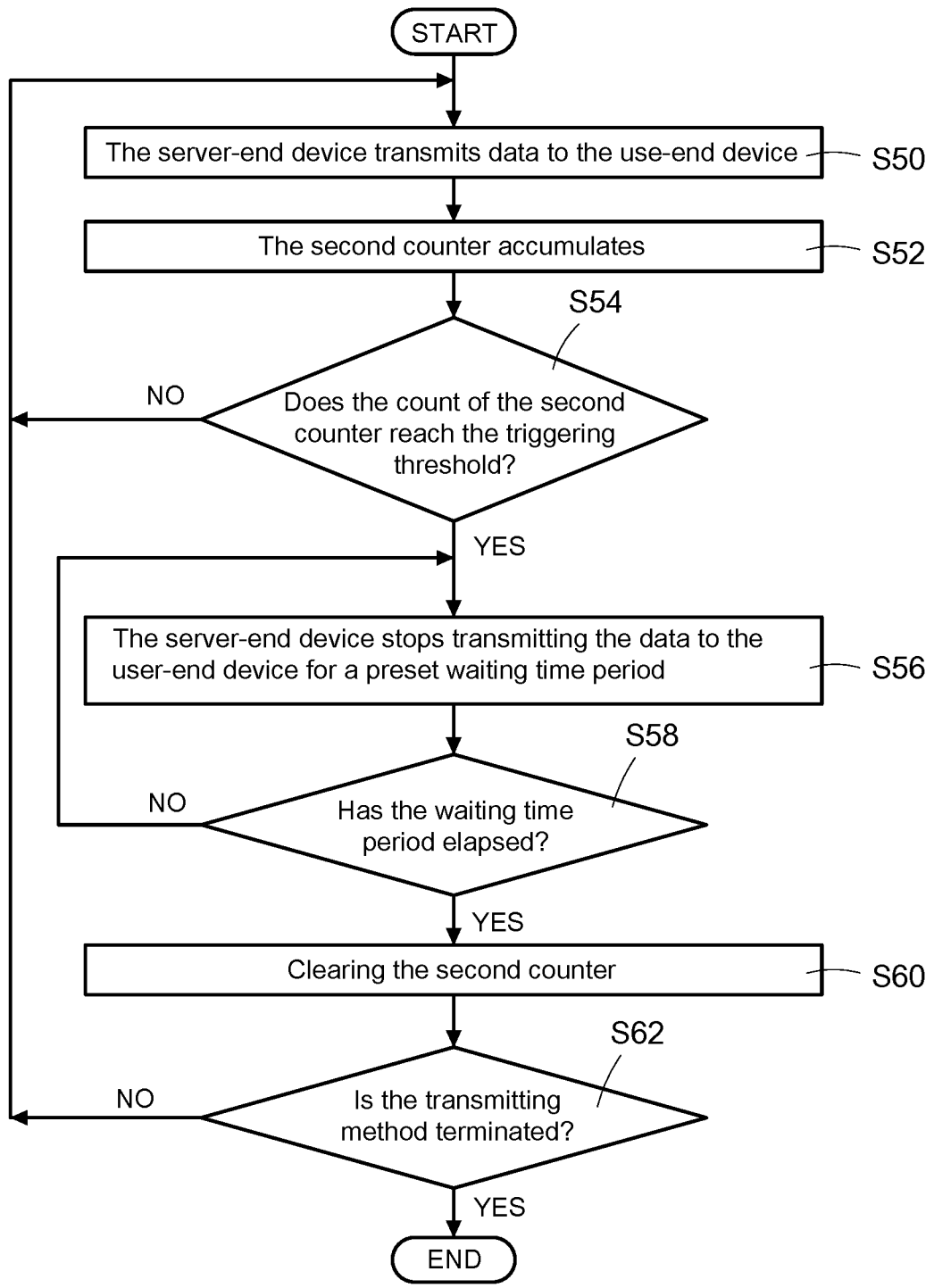
FIG. 6 is a transmission flowchart of a third embodiment according to the present disclosure.

Please refer to FIG. 3, FIG. 4, and FIG. 6, wherein FIG. 6 is a transmission flowchart of a third embodiment according to the present disclosure. Each step shown in FIG. 6 may be applied to the transmission structure as shown in FIG. 3. FIG. 6 is used to interpret the flowchart as shown in FIG. 4 under a perspective of the server-end device 5.

As shown in FIG. 6, after the connection with the user-end device 4 is established through the RS232 serial port 6, the server-end device 5 may continuously transmit data 50 to the use-end device 4 through the RS232 serial port 6 (step S50). In particular, the user may operate the user-end device 4 to command the server-end device 5, so that the server-end device 5 externally retrieves the data 50 demanded by the user and then transmits the retrieved data 50 to the user-end device 4. As a result, the purpose of the user in real-time monitoring through the user-end device 4 may be achieved.

When transmitting the data 50 through the RS232 serial port 6, the server-end device 5 controls the second counter 51 in the server-end device 5 to accumulate (step S52). In particular, the count of the second counter 51 and the count of the first counter 41 in the user-end device 4 are synchronized.

In one embodiment, the server-end device 5 controls the second count 51 to plus one whenever one data 50 is transmitted, but not limited.

The server-end device 5 continuously determines whether the count of the second counter 51 reaches the triggering threshold A1 (step S54). Before the count of the second counter 51 reaches the triggering threshold A1, the server-end device 5 re-executes step S50 and step S52, so that the server-end device 5 keeps collecting and transmitting the data 50 to the user-end device 4 and controlling the second counter 51 to accumulate.

When the count of the second counter 51 reaches the triggering threshold A1, the server-end device 5 stops transmitting the data 50 to the user-end device 4 for a preset waiting time period (step S56), wherein the waiting time period may be the waiting time period T1 as shown in FIG. 3. During the waiting time period T1, the user-end device 5 does not transmit the data to the user-end device 4, but temporarily stores the data 50 in the internal register 52 instead. In addition, during the waiting time period T1, the server-end device 5 may receive one or more control commands 40 transmitted from the user-end device 4.

In the waiting time period T1, the server-end device 5 continuously determines whether the waiting time period T1 has elapsed (step S58).

Before the waiting time period T1 has elapsed, the server-end device 5 re-executes step S58 to continuously wait, store the data 50 that would be transmitted to the user-end device 4, and receive the control command 40 transmitted from the user-end device 4. After the waiting time period T1 has elapsed, the server-end device 5 clears the second counter 51 (step S60).

In a first embodiment, the server-end device 5 clears the second counter 51 after the waiting time period T1 has elapsed. In a second embodiment, the server-end device 5 directly clears the second counter 51 when the count of the second counter 51 reaches the triggering threshold A1. However, the above descriptions are only a few embodiments of the present disclosure, but not limited thereto.

After step S60, the server-end device 5 determines whether the transmitting method of the present disclosure is terminated (step S62), and the server-end device 5 re-executes step S50 through step S60 until the transmitting method is terminated, so as to restore to transmit the data 50 to the user-end device 4 and to control the second counter 51 to accumulate continuously.

It should be mentioned that when the server-end device 5 restores to transmit data 50 to the user-end device 4, the server-end device 5 first transmits the data 50 that is temporarily stored in the register 52 in step S56 to the user-end device 4 and controls the second counter 51 to accumulate, and then the server-end device 5 executes step S50 to transmit next real-time data 50 to the user-end device 4.

As mentioned above, the user-end device 4 and the server-end device 5 may activate the transmitting method of the present disclosure to transmit the data 50 and the control command 40 after they enter a specific mode. In other words, when the user-end device 4 and the server-end device 5 enter another mode, they change to use another transmitting method in order to transmit other data.

Figure 7:
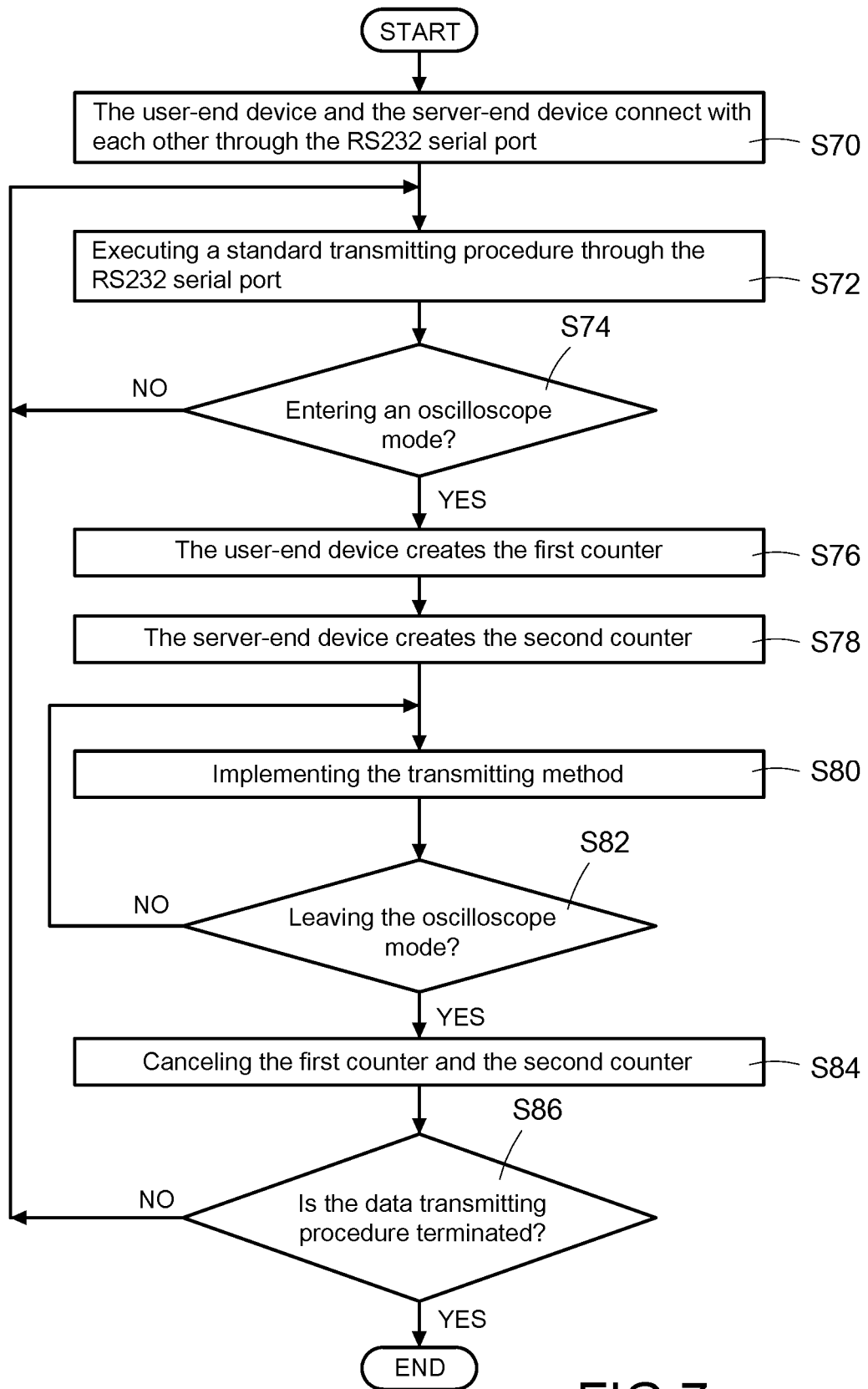
FIG. 7 is a transmission flowchart of a fourth embodiment according to the present disclosure.

Please refer to FIG. 3 and FIG. 7, wherein FIG. 7 is a transmission flowchart of a fourth embodiment according to the present disclosure. Each step of FIG. 7 may be applied to the transmission structure as shown in FIG. 3. As shown in FIG. 7, first, the user-end device 4 and the server-end device 5 connect with each other through the RS232 serial port 6 (step S70). Next, the user-end device 4 and the server-end device 5 execute a standard transmitting procedure through the RS232 serial port 6 (step S72).

In one embodiment, the standard transmitting procedure is a transmitting approach that includes the hand-shaking procedure. In particular, the standard transmitting procedure may include: (1) transmitting data 50 from the server-end device 5 to the user-end device 4, and (2) transmitting a confirmation packet of the data 50 from the user-end device 4 to the server-end device 5 after the user-end device 4 receives the data 50.

During the execution of the standard transmitting procedure, the user-end device 4, the server-end device 5, or other electronic device continuously determines whether the user-end device 4 is controlled by the user to enter an oscilloscope mode (step S74). In one embodiment, the oscilloscope mode is a real-time data monitoring mode that includes the server-end device to continuously transmit real-time data 50 to the user-end device 4 and the user-end device 4 to draw waveform based on the received data 50 and display the waveform in real-time.

The oscilloscope mode is a common technology used in the technical field, detailed description is omitted here.

One technical feature of the present disclosure is that, before the user-end device 4 enters the oscilloscope mode, the user-end device 4 and the server-end device 5 repeatedly execute step S72 to continuously transmit data and control commands by using the standard transmitting procedure. After the user-end device 4 enters the oscilloscope mode, the user-end device 4 and the server-end device 5 terminate the standard transmitting procedure and activate the transmitting method of the present disclosure (i.e., to execute steps as shown in FIG. 4, FIG. 5, and FIG. 6).

In the present disclosure, the user-end device 4 dynamically creates the first counter 41 after entering the oscilloscope mode (step S76), and the server-end device 5 dynamically creates the second counter 51 after entering the oscilloscope mode (step S78). Therefore, during the execution of the oscilloscope mode, the user-end device 4 and the server-end device 5 may perform synchronously counting through the first counter 41 and the second counter 51, so as to implement the transmitting method of the present disclosure (step S80).

The user-end device 4, the server-end device 5, or other electronic device continuously determines whether the user-end device 4 receives the user's control to leave the oscilloscope mode (step S82). Before leaving the oscilloscope mode, the user-end device 4 and the server-end device 5 repeatedly execute step S80 to continuously perform the transmitting method of the present disclosure.

If the user-end device 4 is determined to be leaving the oscilloscope mode in step S82, the user-end device 4 and the server-end device 5 may optionally cancel the first counter 41 and the second counter 51 (step S84) because it is unnecessary for the standard transmitting procedure to perform counting.

Next, the user-end device 4, the server-end device 5, or other electronic device determines whether the data transmitting procedure between the user-end device 4 and the server-end device 5 is terminated (step S86). In one embodiment, the data transmitting procedure between the user-end device 4 and the server-end device 5 is terminated when the RS232 serial port 6 is removed, but not limited thereto.

Before the data transmitting procedure between the user-end device 4 and the server-end device 5 is terminated, the user-end device 4 and the server-end device 5 terminate the transmitting method of the present disclosure and return to step S72, so as to re-execute the standard transmitting procedure. Therefore, the finite resources of the user-end device 4 and the server-end device 5 may be saved.

By using the transmitting method of the present disclosure, the user-end device may receive a maximum amount of data within a shortest time period even if the user-end device uses the RS232 serial port, and the control command transmitted by the user-end device and the data transmitted by the server-end device may be prevented from colliding with each other.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A method of transmitting data and command through RS232 serial port, incorporated with a user-end device and a server-end device connected through an RS232 serial port, comprising:
   a) controlling a first counter of the user-end device and a second counter of the server-end device to accumulate synchronously when the server-end device transmits data to the user-end device;
   b) re-executing the step a) repeatedly until counts of the first counter and the second counter reach a triggering threshold;
   c) stopping transmitting the data to the user-end device for a waiting time period and temporarily storing the data to be sent during the waiting time period by the server-end device when the counts of the first counter and the second counter reach the triggering threshold;
   d) sending a control command to the server-end device in the waiting time period by the user-end device; and
   e) clearing the first counter and the second counter after the waiting time period has elapsed, and then restoring to transmit the data to the user-end device by the server-end device.

2. The method in claim 1, wherein the step a) comprises controlling the second counter to plus one when the server-end device transmits one data to the user-end device and controlling the first counter to plus one when the user-end device receives the data.

3. The method in claim 1, wherein the step e) comprises first transmitting the data temporarily stored in the step c) to the user-end device by the server-end device, then controlling the first counter and the second counter to accumulate synchronously, and then re-executing the step a) to the step e).

4. The method in claim 1, before the step a), further comprising:
   a01) executing a standard transmitting procedure by the server-end device and the user-end device through the RS232 serial port, wherein the standard transmitting procedure comprises the server-end device transmitting data to the user-end device and the user-end device transmitting a confirmation packet of the data to the server-end device; and
   a02) controlling the server-end device and the user-end device to terminate the standard transmitting procedure and execute the step a) to the step e) through the RS232 serial port after the user-end device enters an oscilloscope mode.

5. The method in claim 4, further comprising a step a03): creating the first counter in the user-end device and creating the second counter in the server-end device after the user-end device enters the oscilloscope mode.

6. The method in claim 4, further comprising a step f): canceling the first counter and the second counter and controlling the server-end device and the user-end device to restore the standard transmitting procedure after the user-end device leaves the oscilloscope mode.

7. The method in claim 1, wherein the user-end device comprises a command queue, and the method comprises:
- a1) storing the control command to be sent to the server-end device in the command queue by the user-end device before the counts of the first counter and the second counter reach the triggering threshold;
- wherein, the step d) comprises transmitting the control command stored in the command queue to the server-end device.

8. A method of transmitting data and command through RS232 serial port, incorporated with a server-end device and a user-end device connected through an RS232 serial port, comprising:
- a) controlling a first counter to accumulate when receiving data transmitted from the server-end device, wherein the first counter is synchronized with a second counter in the server-end device;
- b) storing a control command to a command queue when the control command is going to be sent to the server-end device;
- c) re-executing the step a) and the step b) before the count of the first counter reaches a triggering threshold;
- d) transmitting the control command stored in the command queue to the server-end device when the count of the first counter reaches the triggering threshold; and
- e) after the step d), clearing the first counter and re-executing the step a) through the step d).

9. The method in claim 8, further comprising:
- f) creating the first counter and executing the step a) to the step e) when entering an oscilloscope mode; and
- g) canceling the first counter when leaving the oscilloscope mode, wherein the user-end device executes a standard transmitting procedure with the server-end device through the RS232 serial port after leaving the oscilloscope mode, and the standard transmitting procedure comprises the server-end device transmitting data to the user-end device and the user-end device transmitting a confirmation packet of the data to the server-end device.

10. A method of transmitting data and command through RS232 serial port, incorporated with a user-end device and a server-end device connected through an RS232 serial port, comprising:
- a) controlling a second counter to accumulate when transmitting data to the user-end device, wherein the second counter is synchronized with a first counter in the user-end device;
- b) re-executing the step a) until the count of the second counter reaches a triggering threshold;
- c) stopping transmitting the data to the user-end device for a waiting time period and temporarily storing the data to be transmitted during the waiting time period when the count of the second counter reaches the triggering threshold; and
- d) clearing the second counter and restoring to transmit the data to the user-end device after the waiting time period has elapsed.

11. The method in claim 10, wherein the step d) comprises first transmitting the data temporarily stored in the step c) to the user-end device and controlling the second counter to accumulate, and then re-executing the step a) to the step c).

\* \* \* \* \*